May 1, 1962     F. E. TIMMONS     3,032,604
ELECTRICAL CABLE
Filed March 30, 1959

Inventor
FRANK E. TIMMONS
By Soans, Anderson, Luedeka & Fitch
Attys

United States Patent Office 3,032,604
Patented May 1, 1962

3,032,604
ELECTRICAL CABLE
Frank E. Timmons, Richmond, Ind., assignor to Belden Manufacturing Company, Chicago, Ill., a corporation of Illinois
Filed Mar. 30, 1959, Ser. No. 802,773
4 Claims. (Cl. 174—115)

The present invention relates to electrical cables and more particularly to electrical cables which are provided with insulated shields.

For proper transmittal of small signals through an electrical cable, it is necessary to prevent the cable from picking up extraneous voltages from neighboring electrical circuits. If these extraneous voltages are not excluded, they often result in adverse operation of subsequent amplifying equipment. In fact, any foreign or undesired voltages that are picked up by the electrical cable may mask or even destroy the original signal. Therefore, in order to prevent extraneous voltages from being picked up by the electrical cable, it has been common practice to provide such a cable with a metallic shield.

Certain available cables have included one or more shielded pairs of insulated conductors disposed in side-by-side relationship and covered with an insulating sheath. The shield for each pair of conductors has ordinarily been a metallic sleeve composed of copper braid tubing, and the tubing, in turn, has been covered with an insulating sleeve to prevent undesirable ground connections to the shield. Such an electric cable is relatively expensive to manufacture. Moreover, because of the thickness of the copper braid shield and the shield insulation, a cable shielded in this manner is relatively bulky and unduly heavy.

Accordingly, an object of the present invention is the provision of an electrical cable with an improved shield. Another object of the invention is the provision of an electric cable having a metal foil shield which is completely insulated on one side. A further object is the provision of a shielded electrical cable which is inexpensive and simple to manufacture.

Other objects and advantages of the present invention will become apparent by reference to the following description and accompanying drawings.

An electric cable in accordance with the present invention comprises at least one insulated conductor wrapped with a metallic foil strip having one surface insulated. The strip is wrapped about its associated conductor with the insulated surface facing in a direction so as to suitably insulate the metal of the strip and thereby prevent unwanted electrical connections thereto. The strip is wrapped with the longitudinal marginal portions thereof overlapping, the edge of the overlapping marginal portion closer to the unwanted electrical connections being insulated. In this way, the metal of the strip is completely isolated from unwanted electrical connections.

Figure 1:
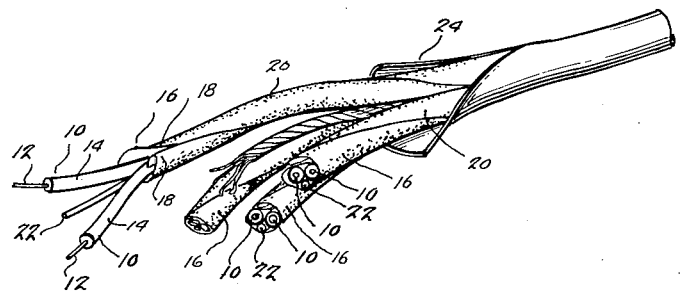
FIGURE 1 is a perspective view of a cable embodying various features of the present invention, the cable being divested of a portion of its outer sheath to show its internal construction.

More specifically, in FIGURE 1, a cable is shown which is commonly utilized to transmit signals in applications such as servomechanism systems, audio systems, etc. The cable includes a plurality of pairs of conductors 10, each conductor 10 including a solid or stranded wire 12 covered in the conventional manner with an insulating sleeve 14 of a material such as rubber, plastic, etc. Each conductor pair 10 is shielded with an elongated strip 16 of metal foil of any of the conductive metals such as copper or aluminum or silver, the metal foil strip 16 being spirally wrapped around the conductor pair 10, as shown in FIGURE 1, with the longitudinal marginal portions 18 thereof overlapping.

Figure 2:
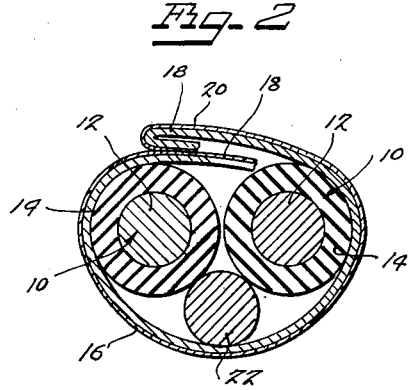
FIGURE 2 is an enlarged transverse cross section of one of the pairs of shielded conductors shown in FIGURE 1.

As particularly shown in FIGURE 2, the surface of the metal foil strip 16 wrapped outermost is insulated by a film 20 of a suitable material such as polyethylene terephthate resin, sold under the trademark "Mylar," tetrafluoroethylene polymer, sold under the trademark "Teflon," vinyl, polyethylene, etc. Such insulation prevents a transfer of voltages between adjacent conductor pairs 10 through the medium of the foil strips 16.

Since the foil strip 16 is spirally wrapped around each conductor pair 10, at certain frequencies the metal foil strip 16 instead of acting as a shield, acts as an inductance, each turn of the strip 16 being equivalent to a turn of a coil. To prevent the spirally wound foil strip 16 from acting as an inductance, an uninsulated wire conductor 22, preferably of solid material, is extended along each conductor pair 10 before the foil strip 16 is wrapped therearound, the uninsulated conductor 22 making electrical contact with the metallic side of each turn of the foil strip 16. Ordinarily, one end of each uninsulated conductor 22 is grounded to thereby ground the foil strip 16 and form an electrostatic or Faraday shield for the conductor pair 10.

Figure 4:
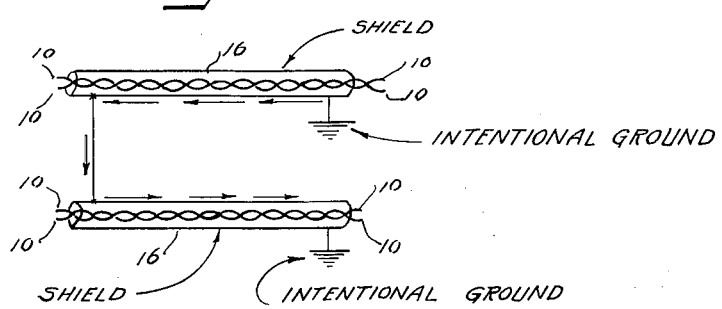
FIGURE 4 is a diagrammatic view illustrating the current flow between shields of adjacent pairs of conductors shown in FIGURE 1, if an unwanted electrical connection occurred therebetween.

To prevent possible interconnections between adjacent wrapped foil strips 16 through the medium of the exposed peripheral edges of the strips 16, the edge of the outer overlapping marginal portion 18 of each wrapped foil strip 16 is insulated by being turned under, as shown in FIGURE 2. If the exposed peripheral edges of the wrapped foil strips 16 are not insulated, one of the peripheral edges may contact the exposed peripheral edge of an adjacent strip 16 and, as shown in FIGURE 4, establish a complete circuit from the intentional ground of one wrapped foil strip 16 through the strip 16 to the connection with the adjacent wrapped foil strip 16, and back through the adjacent strip 16 to the intentional ground of the adjacent strip 16. Thus, any voltage which is induced in the strips 16 by the associated conductor pairs 10 will cause a current to flow in the strips 16 and thereby provide mutual coupling between conductor pairs 10. In operation, this inductive coupling between shielded conductor pairs 10 produces undesirable effects on the signal being transmitted by the conductor pairs 10 and may increase the noise level to such an extent that subsequent amplifiers connected to the cable are unable to distinguish between the extraneous voltage and the signal voltage. Consequently, by turning under the peripheral edge of the outer overlapping portion 18, the metal strip 16 is completely isolated from unwanted grounds. Because it is easily and readily accomplished and because extra material is not required, turning under the peripheral edge of the outer overlapping portion 18 is by far the preferred method of insulating the peripheral edge, but, of course, the exposed edge may be insulated in other ways, as, for example, by covering the exposed edge of the foil strip 16 with an insulating film or lacquer, by utilizing an additional insulating tape to cover the exposed edge, etc.

As shown in FIGURE 1, the plurality of shielded conductor pairs 10 are held in side-by-side relationship by an outer sheath 24 of insulating material, such as plastic, rubber, etc.

While, in the above described embodiment, the insulated metallic foil strip 16 is wrapped around the conductor pair 10 so as to protect the metal of the strip 16 from undesirable grounds, it may be desirable in other forms of cables to protect the metal of the strip from faults in the insulation of one or more conductors.

Figure 3:
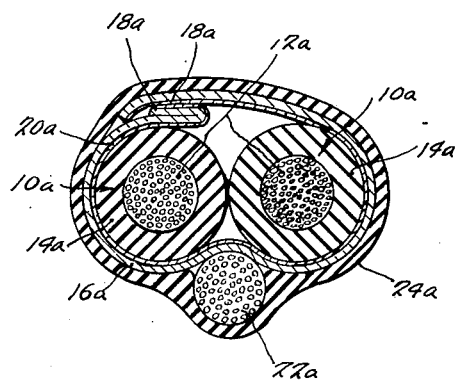
FIGURE 3 is a transverse cross section of a cable showing another embodiment of the present invention.

In the embodiment shown in FIGURE 3, where elements which correspond with those in FIGURES 1 and 2 are designated with the suffix "a," the foil strip 16a is spirally wrapped around a pair of insulated conductors 10a in a similar manner to that described previously, except that the metal surface of the strip 16a is faced toward the outside, thus providing the insulated surface 20a of the strip 16a between the metal of the strip 16a and the conductor pair 10a.

In this embodiment, it is desirable to isolate the metal of the strip 16a from the wire 12a and, therefore, the exposed metallic edge of the inner overlapping marginal portion 18a is folded back between the overlapping portions 18a. In this way, it is not possible for the wire 12a to contact the metal of the strip 16a in case of faults in the insulation 14a of the wire 12a.

To eliminate the inductive effect of the spirally wrapped strip 16a, a ground wire 22a may be run along the outside of the wrapped foil strip 16a so that it contacts the metal of the foil strip 16a. The shielded conductor pair 10a with the ground wire 22a on the outside thereof is covered with a jacket or sheath 24a of insulating material such as rubber, plastic, etc.

By shielding conductor pairs as described above, maximum utilization of space and material weight is obtained. Moreover, since the insulation for the shield is integral with the shield, the shield and its insulation are applied to the conductor pair in the same operation and, therefore, a relatively inexpensive cable is provided.

Various modifications may be made in the above described cable construction without deviating from the spirit or scope of the invention. Various of the features of the invention are set forth in the accompanying claims.

I claim:

1. An electrical cable comprising at least one insulated conductor, a metallic foil strip having a film of insulating material on one surface thereof, said strip being wrapped around said insulated conductor with said film outermost, and with its longitudinal marginal portions overlapping, the outer overlapping marginal portion being folded lengthwise at least partly back upon itself and under said outer marginal portion, so as to effectively provide continuous insulation for the metal of the strip, and an uninsulated conductor extending along said insulated conductor, the metal of said strip being in contact with said uninsulated conductor along the length thereof for grounding said strip.

2. An electrical cable comprising at least one insulated conductor, an uninsulated conductor extending along said insulated conductor, and a metallic foil strip having a film of insulating material on one surface thereof and coextensive therewith, said strip being spirally wrapped around said insulated conductor and said uninsulated conductor with said film outermost and the metal of said strips in contact with said uninsulated conductor along the length thereof and with its longitudinal marginal portions overlapping, the outer overlapping marginal portion being folded lengthwise partially back upon itself and under said outer marginal portion so as to thereby completely isolate the metal of the strip from unwanted electrical connections.

3. An electrical cable comprising a plurality of pairs of insulated conductors, an uninsulated elongated conductor extending along each pair of conductors, a metallic foil strip having a film of insulating material on one surface thereof and coextensive therewith, said strip being spirally wrapped around each of said conductor pairs and the associated uninsulated conductor with said film outermost and the metal of said strip in contact with said uninsulated conductor along the length thereof and with its longitudinal marginal portions overlapping, the outer overlapping marginal portion being folded lengthwise partially back upon itself and under said outer marginal portion so as to thereby completely isolate the metal of each of said strips from the metal of adjacent strips, and an insulating sheath disposed over all of said pairs of conductors.

4. An electrical cable comprising a pair of insulated conductors, a metallic foil strip having a film of insulating material on one surface thereof and coextensive therewith, said strip being spirally wrapped around said pair of insulated conductors with said film innermost and with its longitudinal marginal portions overlapping, the inner overlapping marginal portion being folded lengthwise partially back upon itself and under the outer overlapping marginal portion so as to thereby completely isolate the metal of said strip from possible electrical faults in the insulation of said pair of insulated conductors, an uninsulated conductor extending along said wrapped strip, the metal surface of said strip being in contact with the said uninsulated conductor along the length thereof, and an insulating sheath disposed over said pair of insulated conductors, said wrapped strip, and said uninsulated conductor.

References Cited in the file of this patent

UNITED STATES PATENTS

| | | |
|---|---|---|
| 1,948,616 | Fischer | Feb. 27, 1934 |
| 2,318,367 | Brigg | May 4, 1943 |
| 2,386,753 | Shield | Oct. 16, 1945 |
| 2,515,313 | Buffington | July 18, 1950 |
| 2,663,752 | Wier | Dec. 11, 1953 |
| 2,892,007 | Rickards et al. | June 23, 1959 |
| 2,937,665 | Kennedy | May 24, 1960 |

FOREIGN PATENTS

| | | |
|---|---|---|
| 419,488 | Great Britain | Nov. 13, 1934 |
| 479,481 | Great Britain | Feb. 7, 1938 |

OTHER REFERENCES

Electrical World (publication), July 21, 1958, page 119.